(12) United States Patent
Kang et al.

(10) Patent No.: US 11,729,622 B2
(45) Date of Patent: Aug. 15, 2023

(54) METHOD AND APPARATUS FOR PROCESSING COMMUNICATION COMPANY INFORMATION IN WIRELESS COMMUNICATION SYSTEM

(71) Applicant: Samsung Electronics Co., Ltd., Suwon-si (KR)

(72) Inventors: Sujung Kang, Suwon-si (KR); Duckey Lee, Suwon-si (KR); Kangjin Yoon, Suwon-si (KR); Hyewon Lee, Suwon-si (KR); Jonghan Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/255,976

(22) PCT Filed: Jun. 25, 2019

(86) PCT No.: PCT/KR2019/007652
§ 371 (c)(1),
(2) Date: Dec. 23, 2020

(87) PCT Pub. No.: WO2020/004901
PCT Pub. Date: Jan. 2, 2020

(65) Prior Publication Data
US 2021/0120424 A1      Apr. 22, 2021

(30) Foreign Application Priority Data

Jun. 25, 2018  (KR) .......................... 10-2018-0072995
Oct. 12, 2018  (KR) .......................... 10-2018-0122042

(51) Int. Cl.
*H04W 12/30*     (2021.01)
*H04W 12/71*     (2021.01)
(Continued)

(52) U.S. Cl.
CPC .......... *H04W 12/35* (2021.01); *H04W 8/183* (2013.01); *H04W 8/20* (2013.01); *H04W 8/22* (2013.01); *H04W 12/71* (2021.01); *H04W 48/18* (2013.01)

(58) Field of Classification Search
None
See application file for complete search history.

(56) References Cited

U.S. PATENT DOCUMENTS 9,414,220 B2   8/2016  Lee et al.
9,439,062 B2   9/2016  Li et al.
(Continued)

FOREIGN PATENT DOCUMENTS

KR   10-2014-0039965 A   4/2014
KR   10-2016-0002321 A   1/2016
(Continued)

OTHER PUBLICATIONS

Written Opinion of the International Searching Authority in connection with International Application No. PCT/KR2019/007652 dated Oct. 4, 2019, 6 pages.
(Continued)

*Primary Examiner* — Marisol Figueroa
*Assistant Examiner* — Alexander J Yi

(57) ABSTRACT

The disclosure provides a method of processing communication service provider information by a terminal, the method including identifying a type of a secure element installed in the terminal; obtaining communication service provider information in the secure element through an application corresponding to the identified type of the secure element; and displaying the obtained communication service provider information.

16 Claims, 11 Drawing Sheets

(51) Int. Cl.
*H04W 8/18* (2009.01)
*H04W 8/20* (2009.01)
*H04W 8/22* (2009.01)
*H04W 48/18* (2009.01)

(56) References Cited

U.S. PATENT DOCUMENTS

| | | |
|---|---|---|
| 10,516,988 B2 | 12/2019 | Fan et al. |
| 10,637,822 B2 | 4/2020 | Seo et al. |
| 2004/0147284 A1* | 7/2004 | Laumen ............... H04W 92/08 455/558 |
| 2013/0060959 A1* | 3/2013 | Taveau ............... G06Q 20/3223 709/232 |
| 2014/0220952 A1 | 8/2014 | Holtmanns et al. |
| 2014/0308991 A1* | 10/2014 | Lee ......................... H04W 4/60 455/558 |
| 2015/0319133 A1 | 11/2015 | Seo et al. |
| 2015/0349825 A1 | 12/2015 | Lee et al. |
| 2016/0269891 A1 | 9/2016 | Chen |
| 2017/0156051 A1 | 6/2017 | Park et al. |
| 2017/0237514 A1 | 8/2017 | Mueck et al. |
| 2018/0242141 A1* | 8/2018 | Wu ........................ H04W 8/20 |
| 2018/0255451 A1 | 9/2018 | Fan et al. |
| 2019/0050704 A1* | 2/2019 | Yi ......................... H04W 12/08 |

FOREIGN PATENT DOCUMENTS

| | | |
|---|---|---|
| WO | 2011159549 A9 | 12/2011 |
| WO | 2014/131785 A1 | 9/2014 |
| WO | 2017/041306 A1 | 3/2017 |
| WO | 2017220155 A1 | 12/2017 |

OTHER PUBLICATIONS

International Search Report dated Oct. 4, 2019 in connection with International Patent Application No. PCT/KR2019/007652, 2 pages.
Supplementary European Search Report dated Jul. 23, 2021 in connection with European Application No. 19826505.0, 12 pages.
ETSI TS 103 666-2 v0.6.0 (May 2018), Technical Specification, Smart Secure Platform (SSP); Integrated SSP (iSSP) characteristics (Release 15), May 2018, 18 pages.
GSM Association, Official Document SGP.22—RSP Technical Specification, Version 2.2, Sep. 1, 2017, 264 pages.
Notice of Non-Final Rejection dated Jul. 20, 2022 in connection with Korean Patent Application No. 10-2018-0122042, 11 pages.

* cited by examiner

METHOD AND APPARATUS FOR PROCESSING COMMUNICATION COMPANY INFORMATION IN WIRELESS COMMUNICATION SYSTEM

CROSS-REFERENCE TO RELATED APPLICATIONS

This application is a 371 of International Application No. PCT/KR2019/007652 filed on Jun. 25, 2019, which claims priority to Korean Patent Application No. 10-2018-0072995 filed on Jun. 25, 2018 and Korean Patent Application No. 10-2018-0122042 filed on Oct. 12, 2018, the disclosures of which are herein incorporated by reference in their entirety.

BACKGROUND

1. Field

The disclosure relates to a method and apparatus for processing communication service provider information in a wireless communication system.

2. Description of Related Art

To meet the increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long-term evolution (post-LTE)' systems. To achieve high data transfer rates, implementation of 5G communication systems in an ultra-high frequency (mmWave) band (e.g., a 60-GHz band) is being considered. To reduce path loss of radio waves and increase a transmission distance of radio waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks, for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and reception interference cancellation have been developed. In addition, for 5G communication systems, advanced coding modulation (ACM) technologies, such as hybrid frequency-shift keying (FSK) and quadrature amplitude modulation (QAM) (FQAM) and sliding window superposition coding (SWSC), and advanced access technologies, such as filter bank multi-carrier (FBMC), non-orthogonal multiple access (NOMA), and sparse code multiple access (SCMA), have been developed.

The Internet has evolved from a human-based connection network whereby humans generate and consume information to the Internet-of-things (IoT) whereby distributed elements such as objects exchange information with each other to process the information. Internet-of-Everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required. In recent years, technologies related to sensor networks for connecting objects, machine-to-machine (M2M) communication, and machine-type communication (MTC) have been studied. In an IoT environment, intelligent Internet technology (IT) services may be provided to collect and analyze data obtained from connected objects to generate new value in human life. As existing information technology (IT) and various industries converge and combine with each other, the IoT is applicable to various fields such as smart homes, smart buildings, smart cities, smart cars or connected cars, smart grids, health care, smart home appliances, and advanced medical services.

Various attempts are being made to apply 5G communication systems to the IoT network. For example, technologies such as sensor networks, M2M communication, MTC, or the like are being implemented by using 5G communication technologies such as beamforming, MIMO, array antennas, or the like. Application of the cloud RAN as the above-described big data processing technology may be an example of convergence of 5G communication technology and IoT technology.

As a variety of services can be provided owing to the development of mobile communication systems as described above, a method of effectively providing such services is required.

Embodiments of the disclosure set forth herein are directed to providing an apparatus and method for effectively providing a service in a mobile communication system.

SUMMARY

Embodiments of the disclosure set forth herein provide a method of processing communication service provider information.

According to embodiments of the disclosure set forth herein, services can be effectively provided in a mobile communication system.

DETAILED DESCRIPTION

Figure 1:
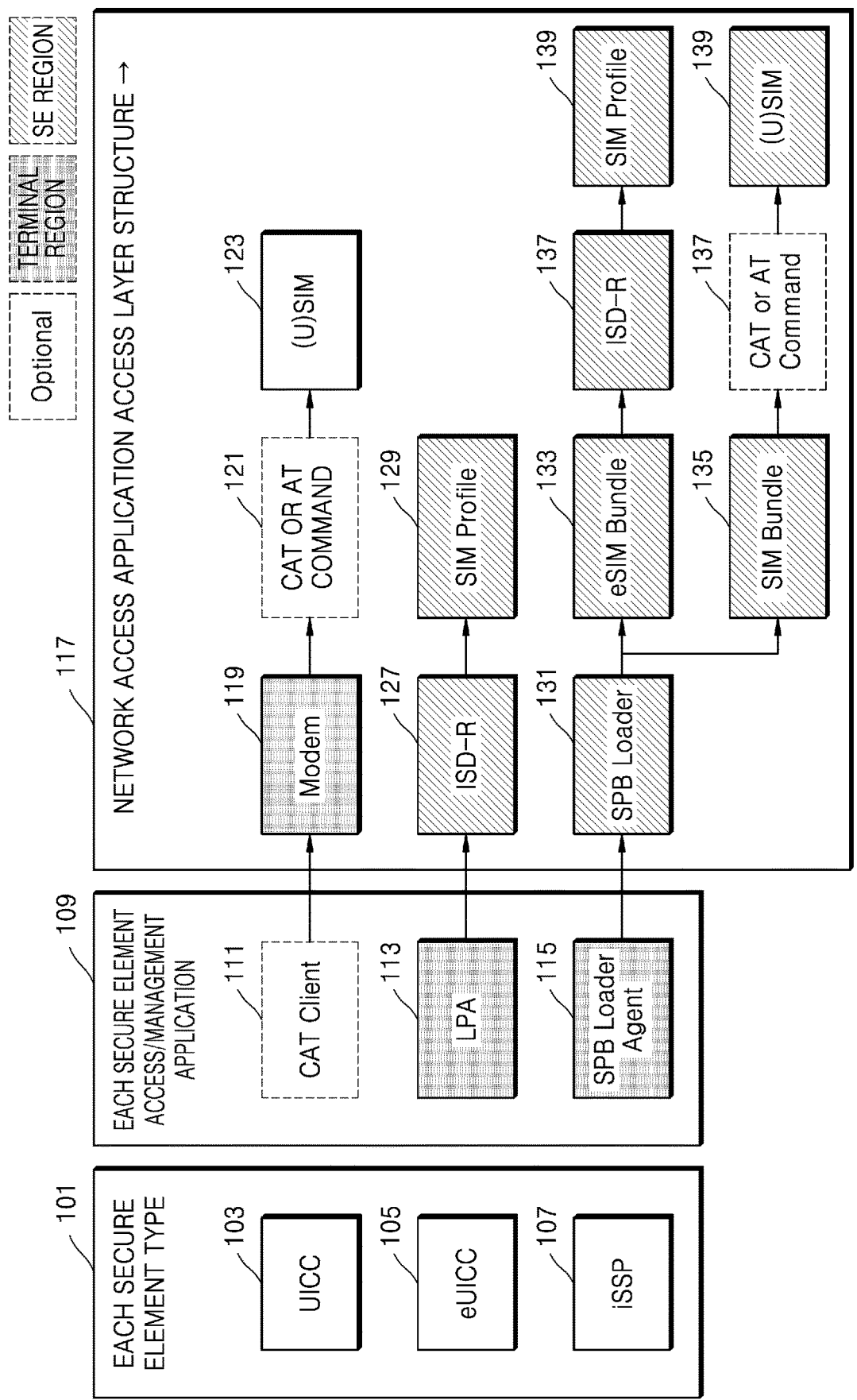
FIG. 1 is a diagram illustrating an application for accessing/managing communication service provider information for each of a Universal Integrated Circuit Card (UICC), an embedded UICC (eUICC), and an integrated Smart Secure Platform (iSSP) and an access layer structure for accessing the communication service provider information, according to an embodiment of the disclosure.

According to an embodiment of the disclosure, a method of processing communication service provider information by a terminal includes: identifying a type of a secure element installed in the terminal; obtaining communication service provider information stored in the secure element through an application corresponding to the identified type of the secure element; and displaying the obtained communication service provider information.

The type of the secure element may include at least one of a Universal Integrated Circuit Card (UICC), an embedded UICC (eUICC) or an integrated Smart Secure Platform (iSSP), wherein the iSSP may include at least one of a Subscriber Identity Module (SIM) bundle or an embedded SIM (eSIM) bundle.

The obtaining of the communication service provider information stored in the secure element through the application corresponding to the identified type of the secure element may include, when the type of the secure element is identified as the UICC, obtaining communication service provider information by controlling a Card Application Toolkit (CAT) in the UICC through a CAT client that is an application corresponding to the UICC.

The obtaining of the communication service provider information stored in the secure element through the application corresponding to the identified type of the secure element may include, when the type of the secure element is identified as the eUICC, obtaining communication service provider information in the eUICC by controlling an Issuer Security Domain Root (ISD-R) in the eUICC through a Local Profile Agent (LPA) that is an application corresponding to the eUICC.

The obtaining of the communication service provider information stored in the secure element through the application corresponding to the identified type of the secure element may include, when the type of the secure element is identified as an integrated Smart Secure Platform (iSSP), obtaining a telecom bundle class identifier in the iSSP through a Secondary Platform Bundle (SPB) loader agent; identifying a type of a bundle included in the iSSP, based on the obtained telecom bundle identifier; and controlling an SPB loader in a SIM bundle when the iSSP includes the SIM bundle, thereby obtaining communication service provider information in the SIM bundle.

The obtaining of the communication service provider information stored in the secure element through the application corresponding to the identified type of the secure element may include, when the type of the secure element is identified as the iSSP, obtaining a telecom bundle identifier in the iSSP through a SPB loader agent; identifying a type of a bundle included in the iSSP, based on the obtained telecom bundle identifier; and when the iSSP includes an eSIM bundle, obtaining communication service provider information in the eSIM bundle from information in a metadata extension of the eSIM bundle, based on information cached in the terminal, or by controlling a Local Profile Agent (LPA) in the eSIM bundle.

The method may further include identifying whether the eSIM bundle is disabled; and enabling the eSIM bundle, based on a result of the identifying.

The method may further include obtaining at least one of policy information of the secure element in the terminal or policy information of a bundle in the secure element; displaying information regarding a communication service provider to be used in a first SIM slot, based on the obtained communication service provider information; and displaying information regarding a communication service provider available in a second SIM slot, based on the obtained policy information and a location in which the communication service provider information is stored.

The method may further include accessing at least one of a communication service provider server or a market server; and selecting a secure element for storing communication service provider information to be downloaded from the communication service provider server or the market server, based on the identified type of the secure element.

The method may further include transmitting information corresponding to the selected secure element to the communication service provider server or the market server, based on the identified type of secure element and the obtained communication service provider information; receiving address information corresponding to the communication service provider information to be downloaded from the communication service provider server or the market server; and downloading the communication service provider information, based on the address information.

According to another embodiment of the disclosure, a terminal for processing communication service provider information includes: a transceiver; and at least one controller coupled to the transceiver and configured to: identify a type of a secure element installed in the terminal; obtain communication service provider information stored in the secure element through an application corresponding to the identified type of the secure element; and display the obtained communication service provider information.

The type of the secure element may include at least one of a Universal Integrated Circuit Card (UICC), an embedded UICC (eUICC) or an integrated Smart Secure Platform (iSSP), wherein the iSSP may include at least one of a Subscriber Identity Module (SIM) bundle or an embedded SIM (eSIM) bundle.

When the type of the secure element is identified as the UICC, the at least one controller may be configured to obtain communication service provider information by controlling a Card Application Toolkit (CAT) in the UICC through a CAT client that is an application corresponding to the UICC.

When the type of the secure element is identified as the eUICC, the at least one controller may be configured to obtain communication service provider information in the eUICC by controlling an Issuer Security Domain Root (ISD-R) in the eUICC through a Local Profile Agent (LPA) that is an application corresponding to the eUICC.

The at least one controller may be configured to, when the type of the secure element is identified as the iSSP, obtain communication service provider information in the SIM bundle by obtaining a telecom bundle class identifier through a Secondary Platform Bundle (SPB) loader agent, identifying a type of a bundle included in the iSSP, based on the obtained telecom bundle class identifier, and when the iSSP includes a SIM bundle, controlling an SPB loader in the SIM bundle.

Hereinafter, an operating principle of the disclosure will be described in detail with reference to the accompanying drawings. In the following description of the disclosure, well-known functions or constructions are not described in detail when it is determined that they would obscure the subject matter of the disclosure due to unnecessary detail. Terms to be described below should be defined in consideration of functions of the disclosure but may be variable depending on the intention of users or operators, practices, or the like. Therefore, the terms should be defined based on the whole context of the disclosure.

For the same reason, some components are exaggerated, omitted, or schematically illustrated in the accompanying drawings. The size of each component does not entirely reflect the actual size thereof. The same reference numbers are allocated to the same or corresponding elements in each drawing.

Advantages and features of the disclosure and methods of achieving them will be apparent from embodiments described in detail, in conjunction with the accompanying drawings. However, the disclosure is not limited to the embodiments thereof below and may be embodied in many different forms. Rather, these embodiments are provided so that this disclosure will be thorough and complete and will fully convey the concept of the disclosure to those of ordinary skill in the art. The disclosure should be defined by the scope of the claims. The same reference numerals refer to the same components throughout the specification. Well-known functions or constructions related to explaining the disclosure are not described in detail when it is determined that they would obscure the subject matter of the disclosure due to unnecessary detail. Terms to be described below should be defined in consideration of functions of the disclosure but may be variable depending on the intention of users or operators, practices, or the like. Therefore, the terms should be defined based on the whole context of the disclosure.

Hereinafter, a base station refers to a subject that allocates a resource to a terminal, and may include at least one of a gNode B, an eNode B, a node B, a base station (BS), a radio access unit, a base station controller, or a node in a network. Examples of a terminal may include a user equipment (UE), a mobile station (MS), a cellular phone, a smartphone, a computer, a multimedia system capable of performing a communication function, or the like. In the disclosure, a downlink (DL) refers to a radio transmission path of a signal transmitted from a base station to a terminal, and an uplink (UL) refers to a radio transmission path of a signal transmitted from the terminal to the base station. Embodiments of the disclosure will be described below, for example, with respect to an LTE or LTE-A system but are applicable to other communication systems having a similar technical background or channel type. For example, 5G mobile communication technology (5G, new radio, and NR) developed after LTE-A may be employed in systems to which embodiments of the disclosure are applicable, and 5G may be understood as a concept including existing LTE, LTE-A and other similar services. The disclosure is also applicable to other communication systems by making some modifications therein according to a judgement of those of ordinary skill in the art without greatly departing from the scope of the disclosure.

In this case, it will be understood that each block of process flowcharts and combinations of the flowcharts may be performed by computer program instructions. The computer program instructions may be installed in a processor of a general-purpose computer, special-purpose computer, or other programmable data processing equipment, so that means to perform functions described in blocks of each flowchart may be produced by instructions executed by the processor of the computer or the other programmable data processing equipment. The computer program instructions may be stored in a computer usable or readable memory oriented to a computer or other programmable data processing equipment to implement functions in a particular way. Thus, an article of manufacture, including an instruction means for performing the function described in a block (or blocks) of each flowchart, may be produced by the instructions stored in the computer usable or readable memory. Because the computer program instructions may be stored in a computer or other programmable data processing equipment, the functions of the blocks of each flowchart may be provided by the instructions performing a series of operations in the computer or the other programmable data processing equipment to produce a process executable by the computer to generate a computer programmable instructions to operate the computer or the other data processing equipment.

In addition, each block may represent a module, segment, or part of code that includes one or more executable instructions for executing specified logical function(s). It should be noted that in some alternative embodiments of the disclosure, the functions described in the blocks may be performed in an order different from that described herein. For example, two blocks illustrated consecutively may be performed substantially simultaneously or performed in a reverse order according to functions corresponding thereto in some cases.

In this case, the term "unit" used in embodiments set forth herein refers to software or a hardware component, such as a field programmable gate array (FPGA) or an application-specific integrated circuit (ASIC), which performs certain functions. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Components and functions provided in "units" may be combined to a smaller number of components and "units" or may be divided into sub-components and "sub-units". In addition, the components and "units" may be implemented to execute one or more CPUs in a device or a secure multimedia card. In embodiments of the disclosure, a "unit" may include one or more processors.

An embodiment of the disclosure provide a method of collectively displaying information regarding communication service providers stored in a hardware secure element (secure element (SE)) built in a terminal and allowing a user to select desired information and a method of downloading Subscriber Identity Module (SIM) information to the terminal.

In a wireless communication system, a Universal Integrated Circuit Card (UICC) is a smart card that is used by being inserted into a mobile communication terminal and the like and includes an access control module for accessing a network of a mobile communication service provider. In one embodiment of the disclosure, examples of the access control module include, but are not limited to, a Universal Subscriber Identity Module (USIM), a Subscriber Identity Module (SIM), an IP Multimedia Service Identity Module (ISIM), and the like.

The UICC is also called a UICC card, a USIM card, or a SIM card and may be called a SIM card in general. The UICC is capable of storing personal information of a mobile communication subscriber, and performs subscriber authentication and generates a traffic security key when a mobile communication network is accessed, thereby enabling secure use of a mobile communication. As the field of Internet of Things (IoT) is increasing, a eUICC (embedded UICC) is being applied to various terminals such as wearable devices, vehicles, smart meters, etc.

The eUICC may refer to a UICC that is selectable by downloading a SIM module. That is, the eUICC may include a UICC that may be fixed or not fixed to a terminal among UICCs that are selectable by downloading a SIM module remotely, and information about the SIM module downloaded to the eUICC may be referred to as a eUICC profile. The eUICC profile may be used interchangeably with other terms such as SIM profile and eSIM Profile.

Recently, standardization for an Integrated Smart Secure Platform (iSSP) is being carried out by the European Telecommunication Standards Institute (ETSI). The iSSP refers to a hardware secure element (SSP) integrated into a communication processor or an application processor chip (System-on-Chip (SoC)), and the SoC is generally soldered onto a terminal not to be detachable.

The iSSP consists of a primary platform and a secondary platform bundle. The primary platform may include at least one of a hardware platform or a low-level operating system (OS), and the secondary platform bundle may include at least one of a high-level OS or an application executed on the high-level OS. The secondary platform bundle is also called an SPB or a bundle.

Downloading the bundle may be expressed as downloading an image. A server that prepares to download an image or stores the image is abbreviated as an image delivery server (IDS). As described above, the images may include a high-level OS and an application executed on the high-level OS but may not include the application.

Among applications installed and driven in the bundle, an application including an access control module for accessing a network of a mobile communication service provider is called a Network Access Application (NAA). Types of bundles may include an eSIM bundle having an attribute corresponding to one eUICC and a SIM bundle having an attribute corresponding to one UICC. The eUICC profile may be downloaded, installed, and driven in an eSIM bundle of a eUICC or an eSIM bundle of an iSSP, and may also be called an NAA when downloaded, installed, and driven in the eSIM bundle of the iSSP.

The 3rd Generation Partnership Project (3GPP) has officially accepted a eUICC in the first 5G standard (completed on June 2018), and has a plan to officially accept the iSSP of the ETSI in the 2nd 5G standardization to be carried out by December 2019. Accordingly, it is expected that terminals supporting an UICC, a eUICC, or an iSSP SoC will be released in the future.

As market requirements to support a dual SIM function of enabling one terminal to simultaneously use two mobile communication networks continuously increase, it is expected that terminals that are each a combination of various SEs supporting a dual SIM function of a UICC and an eUICC, an eUICC and an eUICC, eUICC and iSSP SoC, or the like will be released.

A standard for a different application for access and management of network access application information has been defined for each of an UICC, a eUICC, and an iSSP. Therefore, a terminal should accordingly execute a different application for driving and accessing each of SEs stored therein. As a result, information about all communication service providers stored in the SEs in the terminal cannot be displayed on a user screen at once.

For example, in a terminal to which an eUICC and an iSSP are applied, in order for a user to read communication service provider information stored in the eUICC and display the read information on the terminal, the terminal should execute an Local Profile Agent (LPA) application defined by the Global System for Mobile Communication Association (GSMA) and the iSSP should execute an SPB loader agent application defined by the ETSI.

In addition, the terminal should extract and display communication service provider information so that a user of the terminal may view the communication service provider information, and support the user to select a desired communication service provider to receive a communication service. However, when an NAA is installed in an eSIM bundle of the iSSP in the terminal to which the iSSP is applied, a method of fetching information of the NAA stored in the eSIM bundle is not defined. Therefore, the terminal is not capable of reading information of a communication service provider stored in the eSIM bundle and display this information on a screen. However, for the user, the terminal may allow an SPB loader agent to always check information about a communication service provider of a profile installed in the eSIM bundle even when the eSIM bundle is disabled.

In order to a select a profile of a communication service provider to be made available (for activating or registering), the terminal may provide a list of communication service providers available to the user, based on the number of NAAs that are defined for each SE according to a policy rule and that may be simultaneously enabled.

For example, when an NAA of a communication service provider A and an NAA of a communication service provider B are stored in the eSIM bundle of the iSSP and the user selects the NAA of the communication service provider A, the terminal should disable the NAA of the communication service provider B not to be selected. That is, it may be efficient for the terminal to limit selection of a communication service provider displayed on a screen in terms of user convenience, based on the policy rule of each SE. However, currently introduced terminals do not support a method of limiting selection of a communication service provider, based on the policy rule of each SE, and in particular, in the case of an eSIM bundle, a method of reading a policy rule is not defined.

Finally, there is a case in which the dual SIM function may not be available depending on whether a SIM profile is downloaded to a eUICC or an eSIM bundle of an iSSP. As described above, a user should select an NAA in consideration of the policy rule of each SE and state information of each SE, but it cannot be assumed that the user sets a storage location in consideration of the policy rule of each SE and the state information of each SE and an application downloaded to an SE may not be movable to another SE. Therefore, it may be necessary for the terminal to provide information regarding a position in which the NAA is stored so that a user may use the dual SIM function.

As described above, a Universal Integrated Circuit Card (UICC) may be a smart card used by being inserted into a mobile communication terminal and the like and is also called a UICC card. The UICC may include an access control module for accessing a network of a mobile communication service provider. Examples of the access control module include a USIM, a SIM, an ISIM, and the like. A UICC with a USIM may be referred to as a USIM card. A UICC with a SIM module is generally referred to as a SIM card. As used herein, the term "SIM card" should be understood to include a UICC card, a USIM card, a UICC with an ISIM, and the like. In other words, the SIM card is equally technically applicable to a USIM card, an ISIM card, or a general UICC card.

In one embodiment of the disclosure, the SIM card is capable of storing personal information of a mobile communication subscriber, and performs subscriber authentication and generates a traffic security key when a mobile communication network is accessed, thereby enabling secure use of mobile communication.

In one embodiment of the disclosure, the SIM card may be manufactured as a dedicated card for a certain mobile communication service provider during the manufacture thereof in response to a request from the mobile communication service provider, and authentication information necessary for the communication service provider to access a network, e.g., a Universal Subscriber Identity Module (USIM) application, International Mobile Subscriber Identity (NISI), a subscriber key (K) value, an Operator Constant (OPc) value, etc. may be preloaded to the SIM card and then released. Therefore, the mobile communication service provider may receive the manufactured SIM card and provide it to a subscriber, and a terminal may perform management, including installation, modification, deletion, and the like, of applications in a UICC by using technologies such as over-the-air (OTA). The subscriber may use a network and application services of the mobile communication service provider by inserting the UICC into his or her own mobile communication terminal. When the mobile communication terminal is replaced with a new terminal, the UICC may be removed from the mobile communication and inserted into the new terminal to use, in the new terminal, authentication information, mobile communication phone numbers, a personal phone directory, etc. stored in the UICC.

In one embodiment of the disclosure, in order to download and install a SIM module remotely in a UICC, a SIM module of a mobile communication service to be used may be downloaded to the UICC at a desired point of time. In one embodiment of the disclosure, a plurality of SIM modules may be downloaded and installed in the UICC and only one SIM module may be selected and used from among the plurality of SIM modules. The UICC may be fixed into a terminal or may not be fixed into the terminal. In particular, a UICC fixedly used in a terminal is called an embedded UICC (eUICC).

As used herein, all UICCs that are fixed or not fixed into terminals among UICCs that may be selected by downloading a SIM module thereto remotely will be referred to as eUICCs, and information regarding the downloaded SIM module will be referred to as a eUICC profile.

As used herein, the communication service provider may be used as the same meaning as a service provider, a communication service provider, a mobile communication provider, a carrier, and a mobile operator.

For convenience of description, terms and names defined in the ETSI standards will be hereinafter used herein in the case of the iSSP. However, the disclosure is not limited by these terms and names and is equally applicable to systems conforming to other standards.

As described above, the iSSP refers to a hardware secure element (SSP) integrated into a communication processor or an application processor chip (SoC), and the SoC is generally soldered onto a terminal not to be detachable. The iSSP includes a primary platform and a secondary platform bundle. The primary platform may include at least one of a hardware platform and a low-level OS, and the secondary platform bundle may include at least one of a high-level OS and an application executed on the OS. The secondary platform bundle is also referred to as an SPB or bundle and will be described as a bundle hereinafter.

Downloading a bundle is expressed as downloading an image in the industry, and a server preparing to download an image or storing the image is abbreviated as Image Delivery Server (IDS). Among applications installed and driven in the bundle, an application including an access control module for accessing a network of a mobile communication service provider is called a Network Access Application (NAA). Types of bundles may include an eSIM bundle having an attribute corresponding to one eUICC and a SIM bundle having an attribute corresponding to one UICC. However, embodiments of the disclosure are not limited to the above examples. A eUICC profile may be downloaded, installed, and driven in a eUICC or an eSIM bundle of an iSSP, and may be indicated as an NAA when downloaded, installed, and driven in the eSIM bundle of the iSSP.

As described above, the disclosure provides a method and apparatus for collectively viewing operator information in a terminal applied irrespective of the type of an SE in a communication system, and a method and apparatus for restrictively selecting operator information in the communication system, based on a policy rule of each SE. The disclosure also provides a method and apparatus for allowing a terminal supporting a dual SIM function to download a profile for establishing communication to a storage location that enables the dual SIM function.

In one embodiment of the disclosure, there may be provided a method of supporting a terminal to collectively display stored communication service provider information, a method of reading communication service provider information stored in an eSIM bundle of an iSSP through an iSSP eSIM bundle identifier, a method of limiting a list of communication service providers selectable by a user, based on a policy rule of each SE, and a method of identifying a position in a terminal in which an NAA to be downloaded is to be stored by combining an iSSP eSIM bundle identifier, an additional bundle, and metadata information of the NAA.

In one embodiment of the disclosure, there may be provided a method of displaying operator information in a terminal, the method including identifying whether there is an SE applied to a terminal in an integrated SE UI application of the terminal and information about the SE, obtaining information of communication service providers stored in each SE, and displaying the obtained information.

In one embodiment of the disclosure, the terminal may obtain a user input with respect to an extracted list of communication service providers, identify a menu that needs to be disabled, based on the obtained user input, and controlling only a menu that may be enabled to be displayed.

In one embodiment of the disclosure, the terminal may perform a capability negotiation with a server of a communication service provider or a server available online, and download a profile for establishing communication to a storage location derived based on a result of the capability negotiation.

FIG. 1 is a diagram illustrating an application for accessing/managing communication service provider information for each of a UICC, a eUICC, and an iSSP and an access layer structure for accessing the communication service provider information, according to an embodiment of the disclosure.

A secure element (SE) is a configuration in which a hardware-based network access module may be downloaded or installed and includes a UICC, a eUICC, and an iSSP as described above. The UICC, the eUICC, and the iSSP are as described above and thus a detailed description thereof is omitted here. In an application 109 for controlling an operation of and access to each SE, a Card Application Toolkit (CAT) client 111, a Local Profile Agent (LPA) 113, and a Secondary Platform Bundle (SPB) loader agent 115 are respectively defined as standards of a UICC, a eUICC and an iSSP. The application 109 may serve as a user interface (UI) of a terminal, and a user of the terminal may control the operation of and access to each SE through the application 109.

The CAT client 111 is defined as a standard but may be optional. The CAT client 111 may obtain information about a SIM application 123 of the UICC through communication with a CAT 121 of the UICC, and respond to the information. In the case of a terminal having no UI, a modem 119 may directly request and obtain the information about the SIM application 123 of the UICC through an AT command 121 message.

In one embodiment of the disclosure, when the user of the terminal wants to view communication service provider information from the eUICC 105 through the LPA 113, the LPA 113 may request an Issuer Security Domain Root (ISD-R) 127 to provide an eSIM profile 129, which is a SIM application, and the ISD-R 127 may obtain this information from each profile and provide it to the LPA 113.

In one embodiment of the disclosure, in the case of the iSSP 107, in order for the user of the terminal to access the communication service provider information, the SPB loader agent 115 requests an SPB loader 131 inside the iSSP 107 to provide communication service provider information for bundles, and the SPB Loader 131 collects metadata of the bundles from an eSIM bundle 133 and a SIM bundle 135 as telecom bundles and provides a result value in response to the request.

In one embodiment of the disclosure, the SPB loader 131 may obtain only metadata of bundles, and the eSIM bundle 133 may not store profile information in the metadata of the bundle. Thus, the eSIM bundle 133 cannot provide communication service provider information in response to the request. To provide communication service provider information of a profile from the eSIM Bundle 133, the SPB loader 131 may enable the eSIM bundle 133 or the SPB loader 131 may enable the LPA 113 and the LPA 113 may enable the eSIM bundle 133 and access the inside of the eSIM 133.

Figure 2:
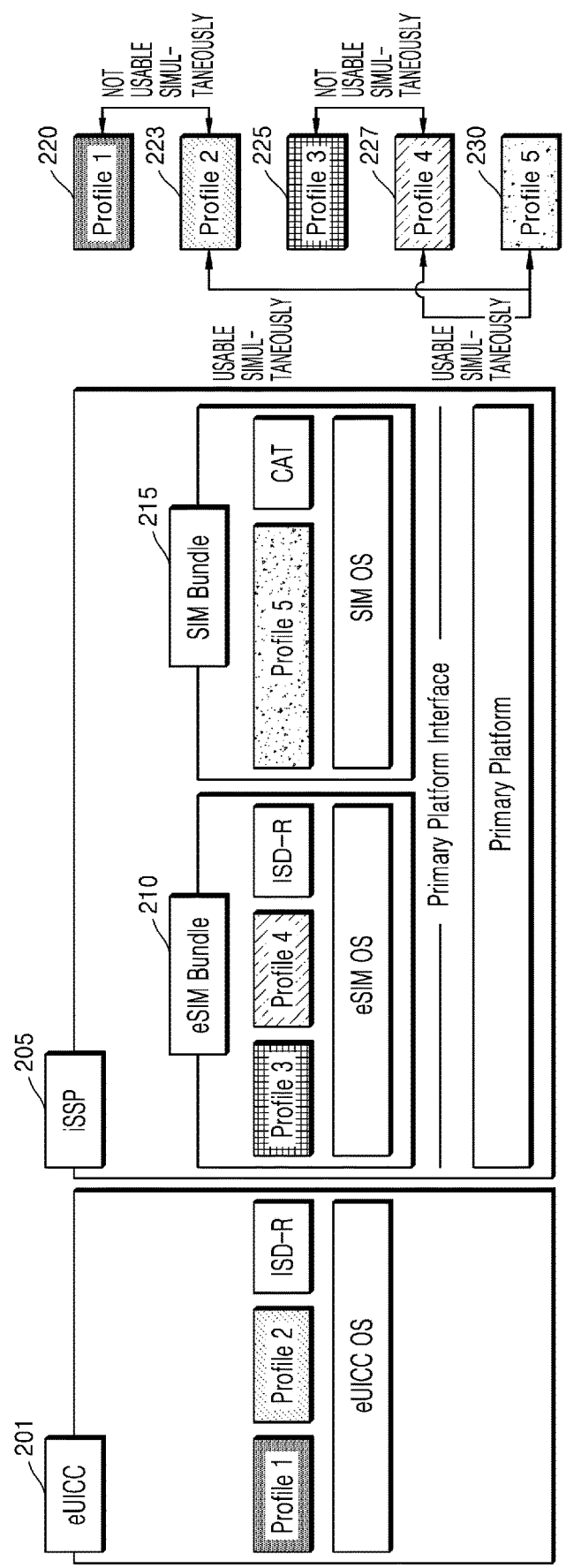
FIG. 2 is a diagram illustrating limiting selection of a communication service provider according to a policy rule of each secure element (SE), according to an embodiment of the disclosure.

FIG. 2 is a diagram illustrating limiting selection of a communication service provider according to a policy rule of each SE, according to an embodiment of the disclosure.

In one embodiment of the disclosure, the numbers of profiles to be simultaneously enabled for respective SEs defined according to a standard policy rule may differ.

Referring to FIG. 2, two communication service provider profiles cannot be simultaneously enabled in both a eUICC 201 and an eSIM bundle 210 of an iSSP 205. However, two mobile communication service providers may be simultaneously enabled in a bundle 215 of the iSSP 205. For example, a profile 4 227 of an eSIM bundle 210 and a profile 5 230 of the SIM bundle 215 may be simultaneously enabled.

Figure 3:
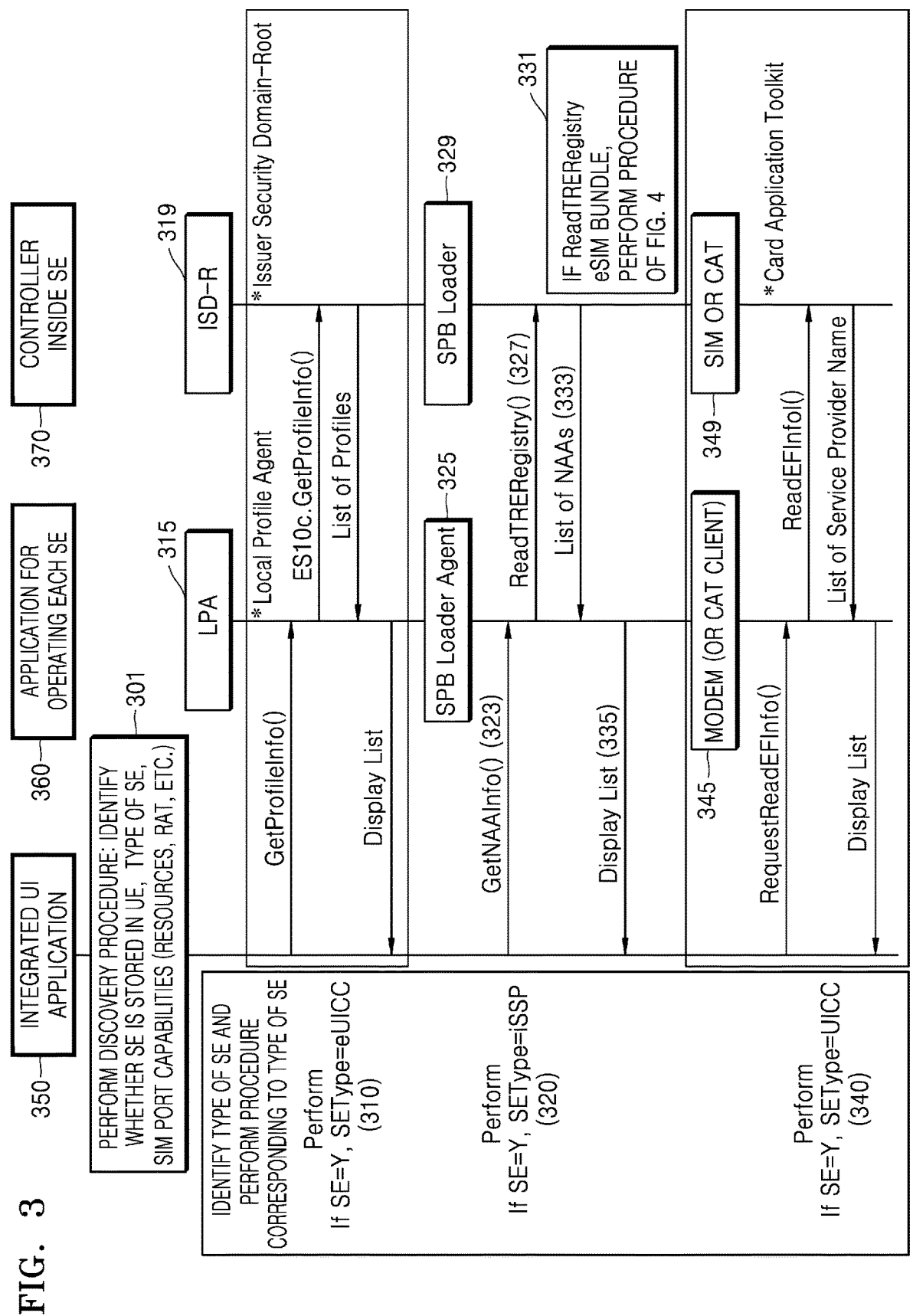
FIG. 3 is a diagram illustrating an operation of a terminal for displaying a list of communication service providers on the terminal, according to an embodiment of the disclosure.

FIG. 3 is a diagram illustrating an operation of a terminal to collectively display a list of communication service providers on the terminal, according to an embodiment of the disclosure.

When an integrated UI application 350 of a terminal is executed, the integrated UI application 350 may identify whether an SE is stored in the terminal, the type of SE, SIM port capabilities of the terminal (supported radio access technology), and the like, through a terminal modem, terminal storage memory, and SE-specific communication.

The SIM port may refer to one logical network connection corresponding to a physical ISO pin. When there is an SE, the integrated UI application 350 performs a procedure including operations 310, 320, and 340 according to the type of SE.

Referring to FIG. 3, operations 310, 320, and 340 of identifying the type of SE and performing the procedure according to the type of SE are only examples, and the order in which operations 310, 320, and 340 are performed may be changed (e.g., to an order of operations 310, 340, and 320). When there is an SE and the type of SE is an eUICC as in operation 310, the integrated UI application 350 may call an LPA 315, which is an application for accessing and driving an eUICC, and thereafter the LPA 315 may request an ISD-R 319 to extract the information for requesting a profile according to a procedure defined in the remote SIM provisioning (RSP) standard by the GSMA and provide the information. The LPA 315 may display the information requesting a profile for the profile by transmitting it to the integrated UI application 350.

When there is an SE and the type of SE is a UICC as in operation 340, the integrated UI application 350 may request a modem or CAT client 345 to call elementary file (EF) information regarding a service provider, and a subsequent procedure may be performed according to the service provider information calling procedure defined in the ETSI and 3GPP standard. The modem or CAT client 345 may transmit the information obtained through this procedure to the integrated UI application 350 to display the information. For example, in the case of an UICC, the modem or CAT client 345 may access a CAT or SIM 349 through a service provider name (EFSPN), read a service provider name, and provide the service provider name.

When there is an SE and the type of SE is an iSSP, operation 320 is performed. The integrated UI application 350 requests the SPB loader agent 325 to provide information about a NAA (operation 323). The SPB loader agent 325 requests the SPB loader 329 to provide information regarding TRERegistry( ) as in operation 327, and obtains the information about the NAA and transmits it to the integrated UI application 350 (operation 333). The integrated UI application 350 may identify that information regarding a profile list, a NAA list, and the service provider name is network operator information and display this information on the terminal.

In the case of an iSSP, information that the SPB loader agent 325 may obtain by performing ReadTRERegistry( ) on the SPB loader 329 to obtain the information regarding the NAA (operation 327) may include a group identifier for a bundle and an identifier for information regarding a NAA in the bundle.

In one embodiment of the disclosure, the group identifier for the bundle may include, but is not limited to, at least one of a bundle identifier (i.e., bundle ID), a family bundle identifier (e.g., telecom), a telecom bundle class identifier (e.g., operational, provisioning, test, or eSIM), bundle status information (disabled, enable, or active), or a policy rule of the bundle, but may include only an identifier that identifies the eSIM bundle.

In one embodiment of the disclosure, the identifier for the information regarding the NAA may include at least one of the number of NAAs included in the bundle, a service provider name for each NAA (string or image), status information of each NAA (disabled, enable, or active), or radio access technology (RAT) supported for each NAA. In the past, only a bundle identifier (i.e., bundle ID) was defined as a group identifier for a bundle.

In the case of an iSSP, when the SPB loader agent 325 performs ReadTRERegistry( ) on the SPB loader 329 (operation 327), the SPB loader 329 may read a metadata value from a bundle, and extract information regarding a NAA by performing a procedure of FIG. 4 as a remaining procedure when it is determined from the telecom bundle class identifier is an eSIM bundle (operation 331).

When it is determined from the telecom bundle class identifier that the iSSP is a SIM bundle (e.g., operational, provisioning, test) rather than an eSIM bundle, the integrated UI application 350 may obtain NAA information through operations 333 and 335.

Although a procedure of requesting and providing only the name of a service provider has been described above with reference to FIG. 3, additional information necessary to display the name of the service provider may be additionally provided. For example, the integrated UI application 350 may additionally request the SPB loader agent 325 to provide and display information necessary to select a communication service provider, e.g., supported wireless access technology, through performing ReadTRERegistry( ) in operation 327.

Figure 4A:
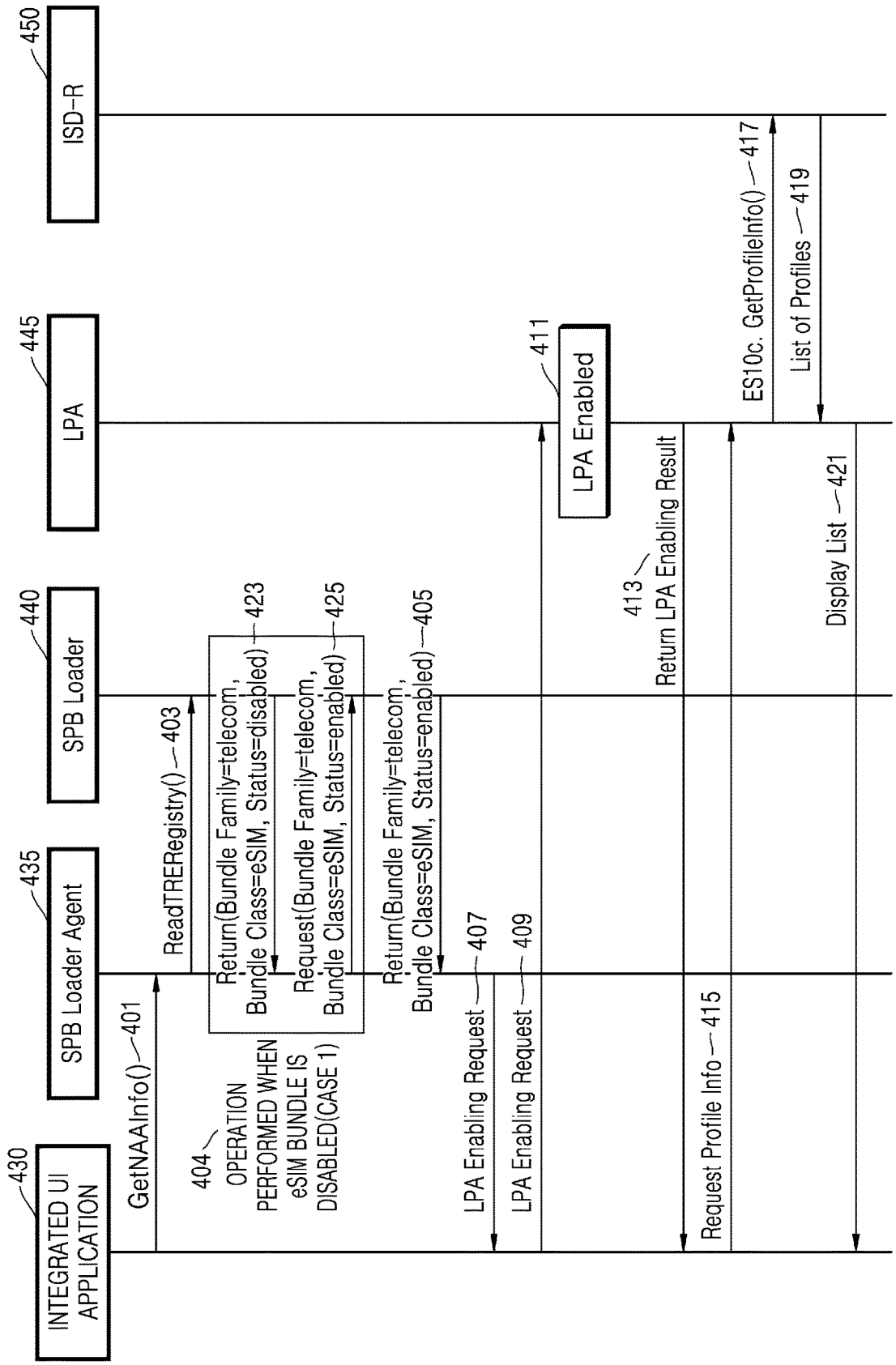
FIG. 4A to 4C are diagrams illustrating methods of obtaining communication service provider information of a network access application (NAA) stored in an embedded Subscriber Identity Module (eSIM) bundle according to whether an integrated Smart Secure Platform (iSSP) includes the eSIM bundle and a state of the eSIM bundle, according to embodiments of the disclosure.
Figure 4B:
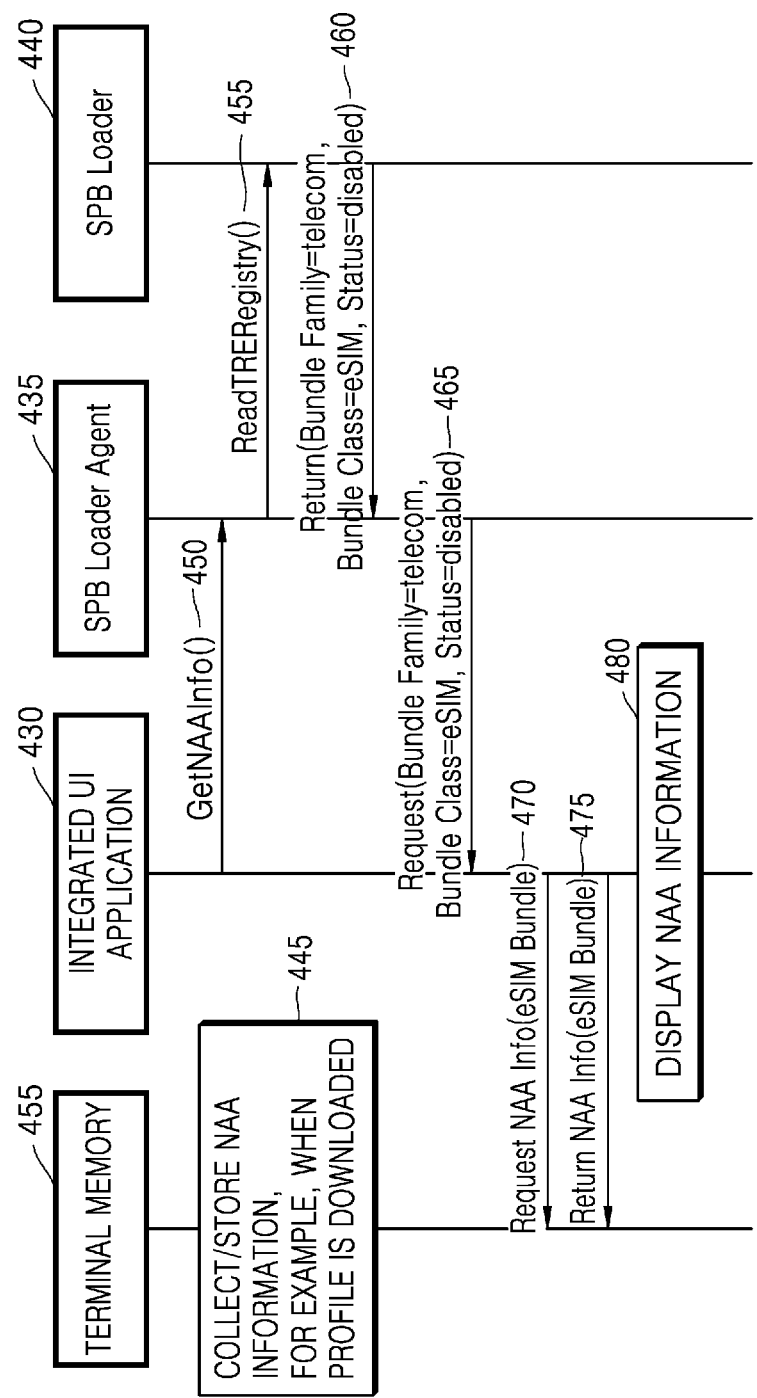
Figure 4C:
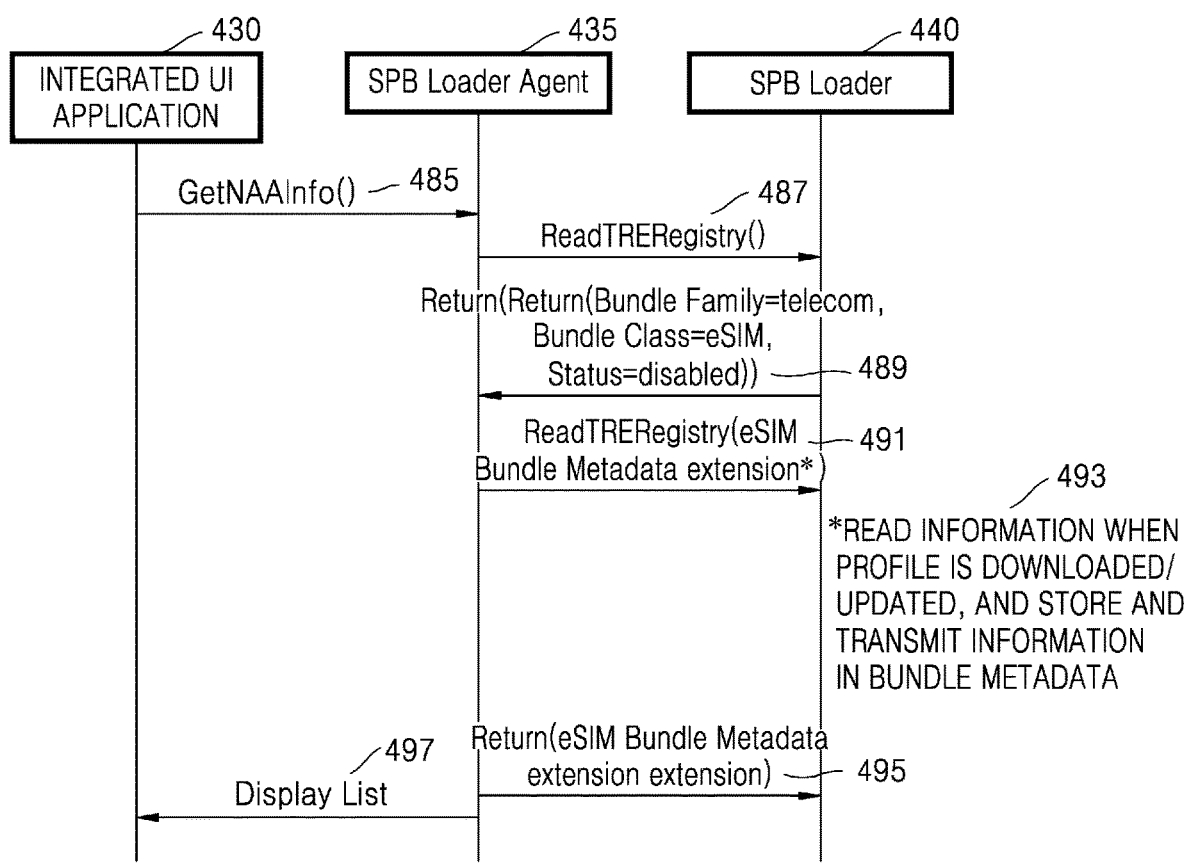

FIG. 4A to 4C are diagrams illustrating methods of obtaining communication service provider information of a NAA stored in an eSIM bundle according to whether an iSSP includes the eSIM bundle and a state of the eSIM bundle, according to embodiments of the disclosure.

When an integrated UI application 430 requests NAA information to obtain communication provider information from an SPB loader agent 435 (operation 401), the SPB loader agent 435 requests an SPB loader 440 to perform ReadTRERegistry( ) so as to collect information regarding a bundle group (operation 403). The SPB loader 440 may transmit, as the information regarding the bundle group, at least one of a bundle identifier, a telecom bundle identifier, an eSIM bundle identifier as a telecom bundle class, or bundle status information.

When the information regarding the bundle group transmitted to the SPB loader agent 435 includes a TelecomFamily identifier, indicates an eSIM bundle, and indicates 'enabled' as a bundle status as in operation 405, the SPB loader agent 435 transmits a request to enable an LPA 445 to the integrated UI application 430 (operation 407), and the integrated UI application 430 transmits an execution command to the LPA 445 (operation 409). However, embodiments of the disclosure are not limited to the above example, and may include a case in which the SPB loader agent 435 directly transmits the execution command to the LPA 445.

When the LPA 445 is enabled, the LPA 445 transmits a result of enabling the LPA 445 to the integrated UI application 430 (operation 413), and the integrated UI application 430 transmits a request for profile information in a eUICC to the LPA 445 (operation 415). Thereafter, the LPA 445 requests an ISD-R 450 to provide profile information, based on the GSMA Remote SIM Provisioning (RSP) standard (operation 417), receives the profile information (operation 419), and transmits the profile information to the integrated UI application 430 (operation 421), and the integrated UI application 430 obtains a communication service provider information list. However, embodiments are not limited to the above example, and the LPA 445 may receive the profile information and transmits it to the SPB loader agent 435, and the SPB Loader Agent 435 may transmit the profile information to the integrated UI application 430.

When a result of collecting the information regarding the bundle group by requesting ReadTRERegistry( ) (operation 403) indicates telecom bundle, eSIM bundle, and disabled as a bundle status as in operation 423, the following three methods may be performed.

A first method is a method of obtaining profile information by enabling the eSIM bundle as in operation 404 of FIG. 4A. After operation 403 is performed, when the SPB loader agent 435 receives, as result values, telecom bundle, eSIM bundle, and disabled as a bundle status as in operation 423, the SPB loader agent 435 transmits a command to enable a corresponding bundle the SPB loader 440 as in operation 425. Thereafter, operations 407 to 421 described above are performed.

A second method is a method of fetching and displaying information cached in a terminal memory 455 as illustrated in FIG. 4B. The terminal memory 455 may cache desired information, including the name of a communication service provider, as information regarding an NAA in the terminal memory 455 whenever an eSIM bundle is enabled, e.g., whenever a profile is downloaded, and may update the cached information with latest information by reflecting a change if any (operation 445). When the integrated UI application 430 requests the SPB loader agent 435 to provide NAA information and the SPB loader agent 435 finally transmits result values indicating a telecom bundle, an eSIM bundle, and disabled as bundle status information in response to the request (operation 465), the integrated UI application 430 may search for information regarding an NAA mapped to a corresponding bundle, extract the name of a communication service provider providing the NAA, and display the name of the communication service provider on the terminal memory 455.

A third method is a method of specifying a metadata extension in an eSIM bundle, storing the name of a communication service provider providing an NAA and the like in the metadata extension, and providing the name of the communication service provider and the like when information regarding the communication service provider is requested, as illustrated in FIG. 4C. In operation 491, in the case of an eSIM bundle, when a profile is downloaded or updated, i.e., enabled, the SPB loader 440 collects information regarding the NAA stored in the eSIM bundle through an ISD-R of the eSIM bundle, and stores the information in the form of metadata in the eSIM bundle. The integrated UI application 430 requests the SPB loader agent 435 to provide NAA information in operation 485, and the SPB loader agent 435 transmits result values indicating a telecom bundle, an eSIM bundle, and disabled as a status of a bundle through communication with the SPB loader 440 in response to the request (operation 489). The SPB loader agent 435 performs ReadTRERegistry (eSIM bundle metadata extension) (operation 495), and receives, from the SPB Loader 440, information regarding an NAA, such as the name of a communication service provider, which is stored in the form of metadata in the eSIM bundle, and transmits the information regarding the NAA to the integrated UI application 430, and the integrated UI application 430 displays a list of communication service providers (operation 497).

Figure 5:
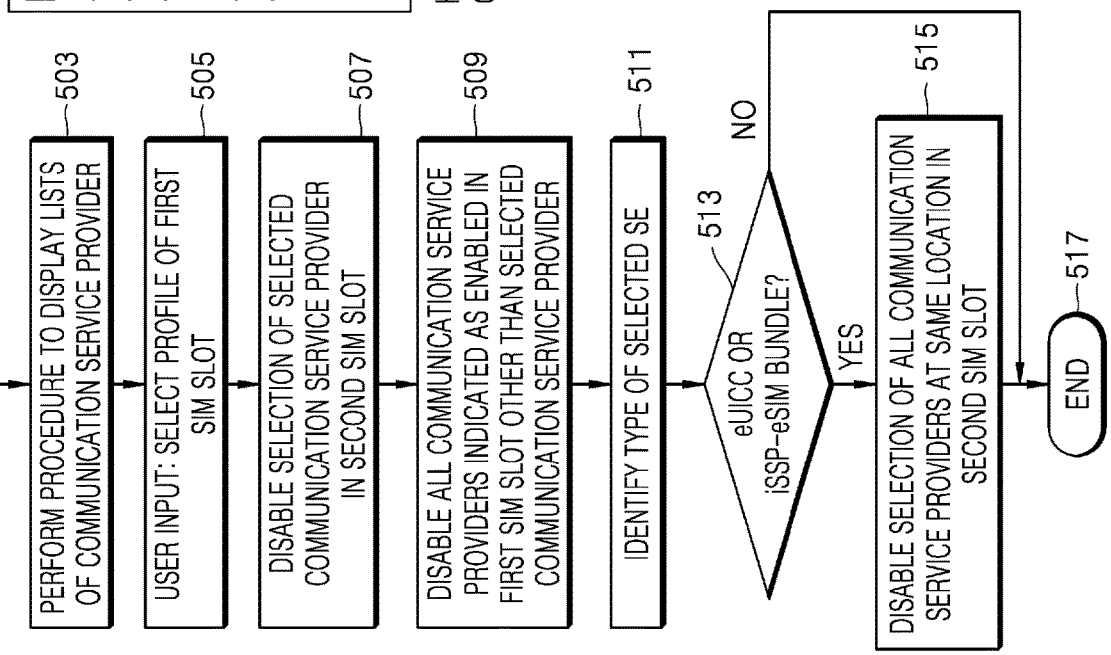
FIG. 5 is a diagram illustrating a method of selecting a communication service provider profile according to an embodiment of the disclosure.

FIG. 5 is a diagram illustrating a method of selecting a communication service provider profile according to an embodiment of the disclosure.

An integrated UI application performs a procedure for displaying a list of communication service providers as described above with reference to FIGS. 3 and 4 (operation 503). During the procedure for displaying the list of communication service providers, a terminal may additionally obtain at least one of a plurality of pieces of certain information, such as the name or image of a communication service provider of an SIM profile, communication technology (RAT) supported for each profile, a SE storing the SIM profile and a location in the SE storing the SIM profile (an eUICC, an iSSP eSIM bundle, an iSSP SIM bundle, a UICC or the like), capability supported for each SIM port (4G, 4G or 5G or the like), a policy rule of each SE, or policy rules of an eSIM bundle and a SIM bundle in an iSSP.

A policy rule of the number of profile to be selected for each SE may be set in advance in the integrated UI application. When the list of communication service providers is displayed on the terminal, a user selects a list of communication service providers to be used in a first SIM slot (operation 505). When the list of communication service providers is selected, a selected communication service provider may be disabled to not be selected in a second SIM slot (operation 507). That is, the selected communication service provider in the second SIM slot may be disabled to not be selected.

All the list of other communication service providers indicated as enabled in the first SIM slot are also disabled to not be selected (operation 509). That is, selection of other communication service providers in the first SIM slot other than the selected communication service provider may be disabled to not be selected.

In addition, the terminal may identify a location in which a profile of the communication service provider selected to use the first SIM slot is stored (operation 511), and when it is determined that the location corresponds to an eUICC or an eSIM bundle of an iSSP (operation 513), another list of communication service providers stored in the same location may be checked and displayed as disabled to prevent slot selection therefor (operation 515). The list of remaining communication service providers may be displayed as selectable operators for the second SIM slot.

Figure 6:
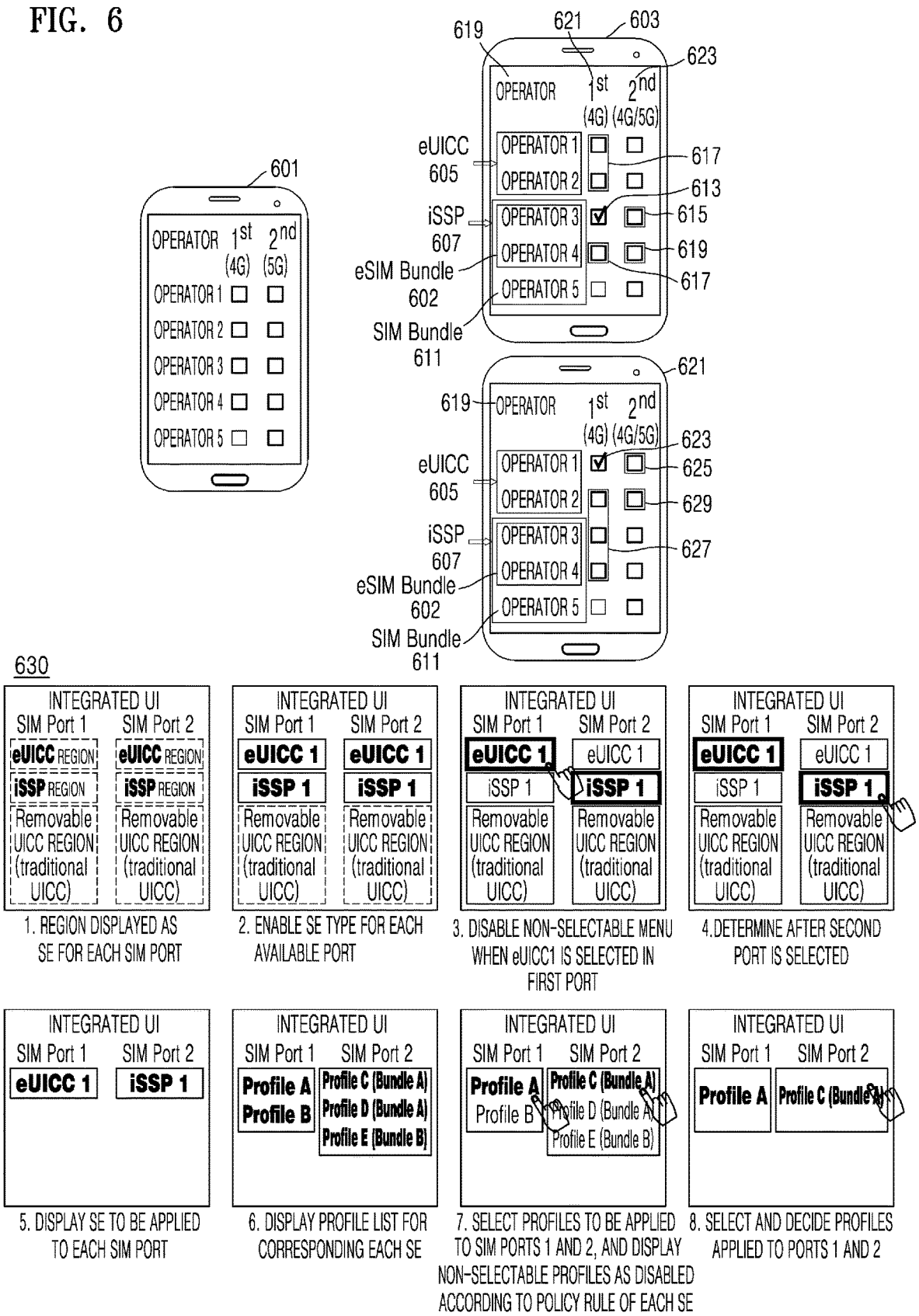
FIG. 6 is a diagram illustrating a User Interface (UI) in which a method of selecting a communication service provider profile according to an embodiment of the disclosure is implemented.

FIG. 6 is a diagram illustrating a UI in which a method of selecting a communication service provider profile according to an embodiment of the disclosure is implemented.

An integrated UI application may obtain the name of a communication service provider stored in an SE, radio access technology supported by the communication service provider, the number of supported SIM slots, and radio access communication technology supported for each SIM slot through the same procedure as in operation 503 of FIG. 5, combine and map the obtained information, and display a result of the combining and mapping on a first screen 601 which is one of screens. A UI may display certain information, which is determined to be necessary for a user to select a communication service provider, together with the result of the combining and mapping. Referring to the first screen 601, communication service providers 1 to 4 may use a slot 1 (first slot, first SIM slot) or a slot 2 (second slot, second SIM slot), and a communication service provider 5 may use only the slot 2.

Referring to a screen 603, when the communication service provider 3 is selected (613), the selection of the communication service provider 3 is disabled in the slot 2 (615) and a SIM of the slot 1 has already been selected, and thus, selection of the other communication service providers 1, 2 and 4 available in the slots 1 is disabled (617). Because a location at which the communication service provider 3 is stored is an eSIM bundle 609 of an iSSP, selection of the communication service provider 4, which is stored in the eSIM bundle 609 of the iSSP, in the slot 2 is displayed as disabled (619).

Referring to a third screen 621 which is another example, when a user selects the communication service provider 1 (623), selection of the slot 2 of the communication service provider 1 is disabled (625) and the slot 1 is selected. Thus, selection of communication service providers available in the slot 1 and selection of the first communication service provider in the slot 1 are disabled (627). In addition, because the communication service provider 1 is stored in a eUICC, selection of the communication service provider 1 in the slot 2 is disabled according to a policy rule of the eUICC collected in operation 503 of FIG. 5.

However, embodiments of the disclosure are not limited thereto, and FIG. 6 illustrates a method of listing, by the integrated UI application, all profiles irrespective of an SE and enabling a user-selectable profile according to the user's selection. In other examples of the integrated UI application (630), a method of selecting an SE to be applied for each SIM port and enable or select only profiles selectable through combination thereof may be provided.

Figure 7:
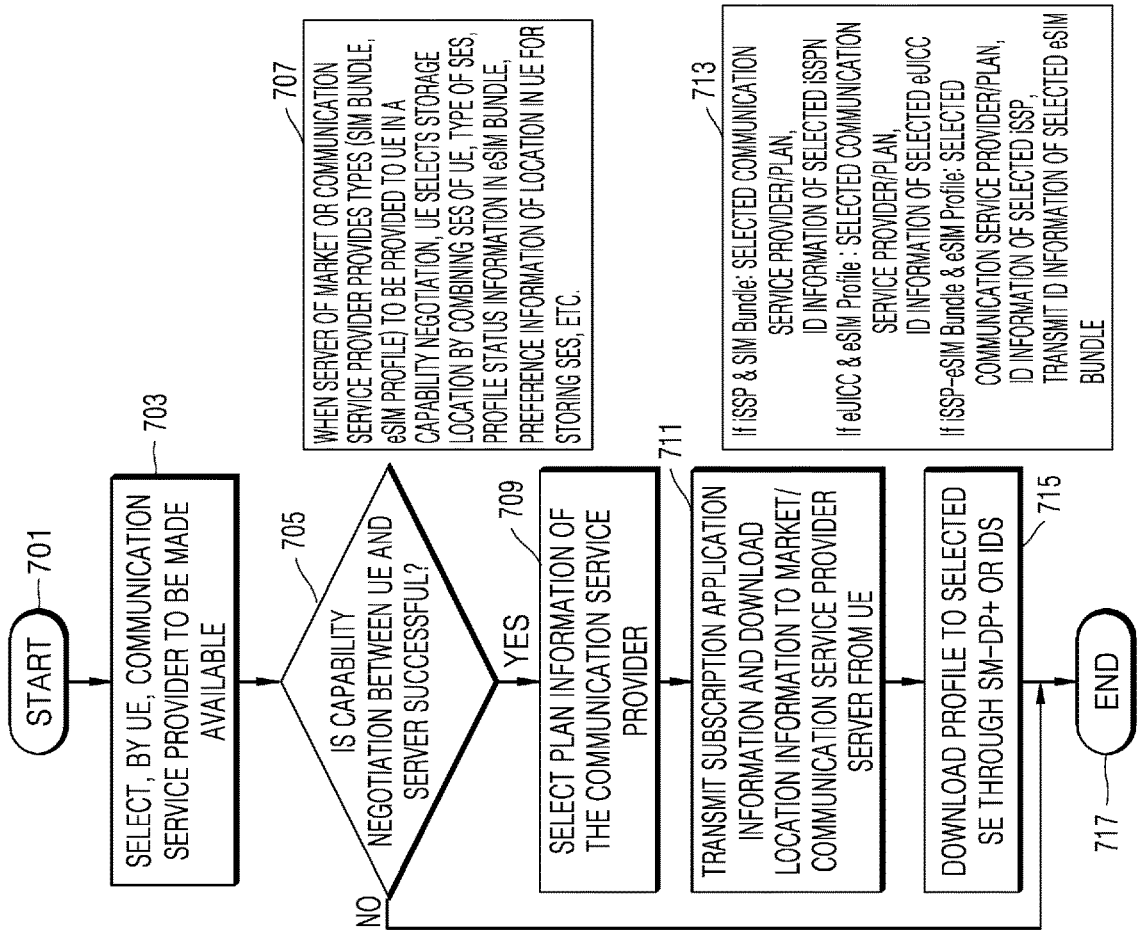
FIG. 7 is a diagram illustrating a method of determining a location in a terminal to which SIM information is to be downloaded, according to an embodiment of the disclosure.

FIG. 7 is a diagram illustrating a method of determining a location in a terminal to which SIM information is to be downloaded, according to an embodiment of the disclosure.

In order to make a communication service available using a terminal, a user may access a web page of a communication service provider or access a web page of a market service broker who brokers market services, at which communication service providers who will make a communication service available have entered to sell communication service provider subscription information. Alternatively, in order to make a communication service available, the user may use a method of inputting activation code to an SPB loader agent or an LPA of the terminal through another channel.

The terminal may select a communication service provider to connect to use through a web page (operation 703). For example, when the terminal attempts to access the web page of the communication service provider, a server of the communication service provider or a server of a market that stores sales information of services of the communication service provider sold on the market performs capability negotiation with the terminal (operation 705).

During the capability negotiation, the server of the communication service provider or the server of the market provides the terminal with subscription information that the communication service provider may provide, a SIM bundle (image) as a download type, and whether an eSIM profile is supported.

The terminal may check whether an SE is stored therein and the type of SE by performing the discovery procedure of operation 301 of FIG. 3 in the terminal. The terminal performs first matching to determine whether downloading is available, and determines an SE to be stored, when necessary, by additionally identifying/combining profile status information in an eUICC, whether an eSIM bundle is included in an iSSP, status information of an NAA, and preference information of an SE storage location in the terminal. Thereafter, when the terminal selects plan information of the communication service provider to be used, based on a user input (operation 709), the terminal transmits subscription application information and download location information to the server of the market/server of the communication service provider (operation 711).

In one embodiment of the disclosure, information to be transmitted may vary according to a combination of the download location information and the download type (713). In the case of a combination of an iSSP and an SIM bundle, information identifying the selected communication service provider/plan and iSSP ID may be transmitted to the server of the communication service provider. In the case of a combination of a eUICC and an eSIM profile, information identifying the selected communication service provider/plan and EID information may be transmitted to the server of the communication service provider. In the case of a combination of an iSSP, an eSIM bundle and an eSIM profile, information identifying the selected communication service provider/plan, iSSP ID, and eSIM bundle ID may be transmitted to the server of the communication service provider. The terminal may directly transmit the iSSP ID, the EID, and the eSIM bundle ID to a server directly, through a means (e.g., certificate or the like) that includes the iSSP ID, the EID, and the eSIM bundle ID, or through temporary ID identifying the iSSP ID, the EID, and the eSIM bundle ID. However, embodiments are not limited thereto, and it is sufficient for the terminal to provide certain information through which the server may obtain the iSSP ID, the EID, and the eSIM bundle ID.

The server of the communication service provider/the server of the market downloads a profile to a selected storage location in the terminal to make the terminal available through Subscription Manager Data Preparation (enhanced version) (SM-DP+) in the case of an eSIM profile or through an Image Delivery Server (IDS) in the case of a SIM Profile (operation 715).

In order to download the profile, the server of the communication service provider or the server of the market server may have stored the SM-DP+ or IDS address lists and provide corresponding IDS or SM-DP+ address information, based on a communication service provider or a subscription plan selected by a user. Otherwise, the manufacturer of the terminal may store the address of the IDS or SM-DP+ in an SPB loader agent, an LPA or an iSSP module, and may check the address of the IDS or SM-DP+ stored in the SPB loader agent or the LPA when activation code is input to the SPB loader agent or check whether the address of the IDS or SM-DP+ is stored in the iSSP module and obtain the address of the IDS or SM-DP+ through an SPB loader of the iSSP.

A table 719 of FIG. 7 shows in detail the types of an SE and a communication service provider to be provided through matching between the type of a terminal and the type of the communication service provider r during capability negotiation.

In one embodiment of the disclosure, in the case of orange portions 730 corresponding to a case in which a terminal includes only a eUICC and the communication service provider provides an eSIM profile, the eSIM profile is always stored. When there are two or more eUICCs, the terminal may determine a eUICC, which does not include a communication service provider profile, to be a location to which a profile is to be downloaded and transmit EID information of the eUICC. When neither of the two eUICCs store a profile, the terminal transmits EID of a eUICC accessed first or EID of a eUICC selected by a user.

In one embodiment of the disclosure, in the case of azure portions 740 corresponding to a case in which the terminal includes an iSSP and the communication service provider provides a SIM bundle, the terminal always primarily stores an SIM bundle type in the iSSP to support the dual SIM function through the SIM bundle type.

In one embodiment of the disclosure, in the case of yellow portions 750 corresponding to a case in which the terminal includes an iSSP and the communication service provider provides only an eSIM profile, whether an eSIM bundle is included in the iSSP may be determined and when there is an NAA, the terminal may allow a user to download the NAA to the eSIM bundle or to generate a new bundle and download the NAA to the new bundle. Alternatively, when no NAA is included in the eSIM bundle, the NAA may be download to the eSIM bundle. However, when there is only an eSIM bundle in which an NAA has already be stored, the terminal transmits a notification message indicating that the dual SIM function cannot be used when the eSIM profile is downloaded to the eSIM bundle. The terminal may create and store a new bundle by requesting an IDS in advance to provide a bundle image or may newly create and use a new bundle.

In one embodiment of the disclosure, in the case of purple portions 760 corresponding to a case in which the terminal includes an iSSP and the communication service provider provides only an eSIM profile, the terminal may check whether an eUICC includes a profile before identifying the yellow portions 750 when the terminal additionally includes the eUICC and may download the eSIM profile to the eUICC and skipping identifying an iSSP with respect to the yellow portions 750 when there is no eSIM profile.

That is, as described above, the disclosure relates to a communication technique and system for converging a 5G communication system with IoT technology to support a higher data transfer rate after the 4G system. The disclosure is applicable to intelligent services (e.g., smart home, smart buildings, smart cities, smart cars or connected cars, health care, digital education, retail business, security, safety-related services, etc.) based on 5G communication technology and IoT-related technology. The disclosure provides a method of obtaining information, e.g., the name, of a communication service provider stored in each secure hardware module (SE) when each SE is stored in a UICC, an eUICC, an iSSP or a combination thereof in a terminal in a wireless communication system, a method of displaying the information in the same UI on a terminal in an integrated manner, a method of providing only selectable communication service providers so that a user may select a selectable communication service provider, a method of allowing a user to identify a storage location by checking and combining an SIM information type (an eSIM profile and an SIM bundle), the type of SE, whether there is an SE in the terminal, a profile status, etc., and the like, and supporting downloading of the information.

In one embodiment of the disclosure, a SE driving/accessing method and apparatus may be provided to a user of a terminal when a UICC, an iSSP, a eUICC, or a combination thereof is included in the terminal.

In one embodiment of the disclosure, information regarding an NAA in an eSM bundle of a terminal equipped with an iSSP may be displayed.

In one embodiment of the disclosure, when an iSSP or a combination of a UICC, the iSSP, and a eUICC are included, selection of a communication service provider to be made available to a user may be limited and certain information determined to be useful for the selection may be provided.

In addition, in one embodiment of the disclosure, the dual SIM function may be provided, and unnecessary waste of communication resources and procedures such re-downloading by a user may be prevented by automatically setting a download type (an image or an eUICC profile) and position in a terminal having the dual SIM function or suggesting the download type and position to the user.

Figure 8:
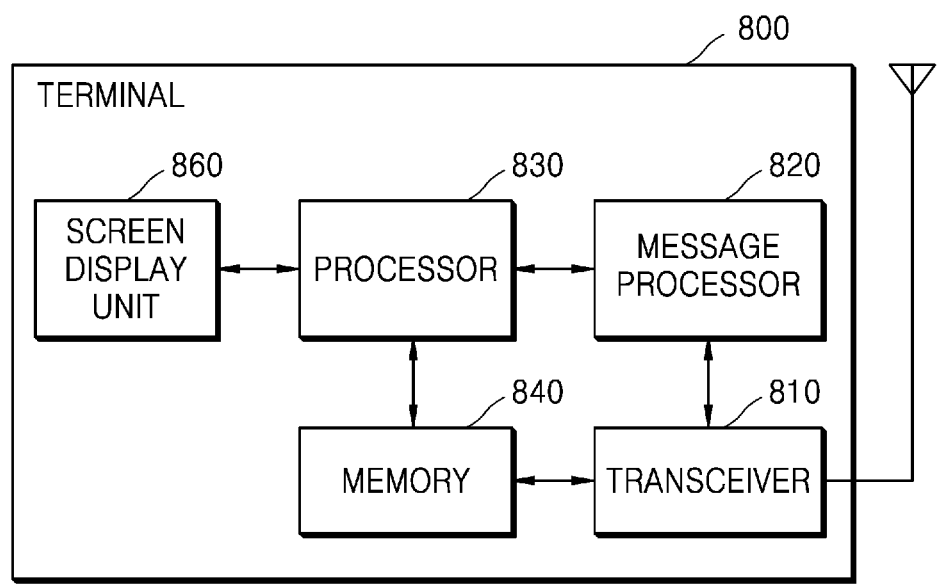
FIG. 8 illustrates a detailed configuration of a terminal in a wireless communication system, according to an embodiment of the disclosure.

FIG. 8 illustrates a configuration of a terminal in a wireless communication system according to an embodiment of the disclosure.

Referring to FIG. 8, a terminal 800 includes a transceiver 810, a message processor 820, a processor 830, a memory 840, and a screen display unit 860. However, components of the terminal 800 are not limited thereto. For example, the terminal 800 may include more components or fewer components than the components described above. At least one component of the terminal 800 may be embodied as one chip.

In one embodiment of the disclosure, the transceiver 810 performs a function of transmitting and receiving signals through a radio channel, such as signal band conversion, amplification, and the like. That is, the transceiver 810 may include an RF processor which up-converts a baseband signal into an RF band signal and then transmits the RF band signal through an antenna, and down-converts an RF band signal received through the antenna into a baseband signal, and may further include a transmission filter, a reception filter, an amplifier, a mixer, an oscillator, a digital-to-analog convertor (DAC), an analog to digital convertor (ADC), and the like. The transceiver 810 may receive a signal and output the signal to the processor 830 through a radio channel, and transmit a signal output from the processor 830 through the radio channel.

In one embodiment of the disclosure, although FIG. 8 illustrates only one antenna, the terminal may include a plurality of antennas. The transceiver 810 may include a plurality of RF chains. The transceiver 810 may perform beamforming. For beamforming, the transceiver 810 may adjust a phase and magnitude of each of signals transmitted and received through the plurality of antennas or antenna elements.

A baseband processor included in the transceiver 810 performs conversion between a baseband signal and a bit string according to a physical layer standard of the system. For example, for data transmission, the baseband processor generates complex symbols by encoding and modulating a transmission bit string. For data reception, the baseband processor reconstructs a received bit string through demodulation and decoding of a baseband signal provided from the RF processor. For example, when an orthogonal frequency division multiplexing (OFDM) scheme is used, for data transmission, the baseband processor generates complex symbols by encoding and modulating a transmission bit string, maps the complex symbols to subcarriers, and constructs OFDM symbols through inverse fast Fourier transform (IFFT) and cyclic prefix (CP) insertion. For data reception, the baseband processor divides a baseband signal from the RF processor into OFDM symbols, reconstructs signals mapped to subcarriers through fast Fourier transform (FFT), and reconstructs a received bit string by demodulation and decoding. The transceiver 810 may be defined as a transceiver, and may include a message transceiver. The message processor 820 may perform an operation of identifying which type of message is data transmitted or received through the transceiver 810. For example, the message processor 820 may identify whether a received message is a control message of a radio resource control (RRC) layer (including a system information block (SIB)) or a data message of a user. The processor 820 may be included in the controller 830.

The processor 830 controls overall operations of the terminal 800. For example, the processor 830 transmits and receives signals through the message processor 820. In addition, the processor 830 writes data to and reads data from the memory 840. At least one processor 830 may be provided. For example, the processor 830 may include a communication processor (CP) for control of communication and an application processor (AP) for control of an upper layer such as an application program.

In one embodiment of the disclosure, when a list of communication service providers is stored in advance in the memory 840, the screen display unit 860 may display the list of communication service providers. The processor 830, the message processor 820, and the transceiver 810 may control the terminal 800 to access a service provider network selected by a user.

In one embodiment of the disclosure, the processor 830 performs a process of inferring, by the terminal 800, information that may be referred to for selection of a service by matching a data record read from the memory 840 or information regarding neighboring cells collected through the processor 830, the message processor 820 and the transceiver 810.

In one embodiment of the disclosure, the processor 830 determines whether it is necessary to display a list of communication service providers stored in the terminal 800, and obtains the list of communication service providers and displays this list on the screen display unit 860 when it is necessary to display the list of communication service providers. The processor 830 may control the terminal 800 to identify an eSIM bundle and status information (enabled, disabled or active) of the eSIM bundle among bundles of an iSSP and to perform an operation corresponding thereto during the obtaining of the list of communication service providers.

In one embodiment of the disclosure, the processor 830 may include an application for driving and controlling secure elements (SEs) such as an LPA, a CAT, and an SPB loader agent. The processor 830 may collect certain information for selection of a communication service provider for each SE collected through the processor 830 and the memory 840, determine whether communication service providers are selectable by a user, and display only selectable communication service providers on the screen display unit 860.

In addition, the processor 830 may control the terminal 900 to obtain profile download type information that may be provided by communication service providers collected by the message processor 820 and the transceiver 810, identify a position at which a profile is stored by combining the profile download type information with information regarding whether there is an SE, which is obtained from the memory 840 of the terminal 800, and store the profile download type information at a desired location.

Information regarding a profile type that an operator may provide may include at least one of a telecom group identifier, a telecom group class, identification information of an eSIM bundle, or identification information of an SIM bundle. The processor 830 may determine whether to generate a new eSIM bundle by using information regarding a desired storage location, which is obtained from the message processor 820, the transceiver 810, and the memory 840.

The processor 830 may control the terminal 800 to transmit a connection request message for viewing a list of communication service providers to the memory 840 and receive a connection response message. The connection request message may include information indicating a reason for connection for a service for viewing, selecting and downloading information about a communication service provider. In addition, the processor 830 may control the terminal 800 to display operator service information and control the terminal 800 and limit selectable operators, based on the displayed operator service information.

The memory 840 stores data such as a basic program, an application program, and configuration information for operation of the terminal 800. The memory 840 may include a UICC, a eUICC, and an iSSP, which are hardware secure elements built into the terminal 800. The memory 840 may provide stored data in response to a request from the processor 830.

The memory 840 may include storage media such as a ROM, a RAM, a hard disk, a CD-ROM, and a DVD or a combination thereof. The memory 2403 may include a plurality of memories.

The screen display unit 860 may display information handled/processed by the processor 830 or display consent for an event that the terminal 800 automatically performs or requests a user to perform through an operation of the processor 830. In one embodiment of the disclosure, an integrated UI application may control or include the screen display unit 860 and the processor 830. However, embodiments of the disclosure are not limited thereto.

Each component of the terminal 800 may operate to perform the embodiments of the disclosure described above with reference to FIGS. 1 to 7.

Figure 9:
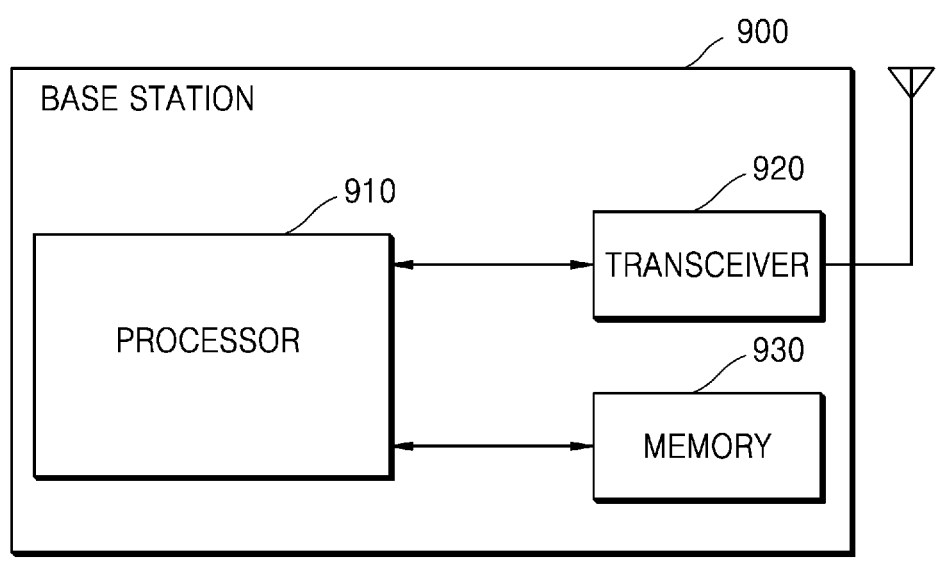
FIG. 9 illustrates a detailed configuration of a base station in a wireless communication system, according to an embodiment of the disclosure.

FIG. 9 illustrates a detailed configuration of a base station in a wireless communication system according to an embodiment of the disclosure. As illustrated in FIG. 9, the base station of the disclosure may include a processor 910, a transceiver 920, and a memory 930. However, components of the base station are not limited thereto. For example, the base station may include more components or fewer components than the components described above. The processor 910, the transceiver 920, and the memory 930 may be embodied as one chip.

In one embodiment of the disclosure, the processor 901 may control a series of processes so that the base station may operate according to the above-described embodiments of the disclosure. The transceiver 920 may transmit signals to and receive signals from a terminal. The signals transmitted to and received from the terminal may include control information and data. In one embodiment of the disclosure, the transceiver 920 may include an RF transmitter that up-converts and amplifies a frequency of a signal to be transmitted, an RF receiver that low-noise amplifies a received signal and down-converts a frequency of the signal, and the like. However, the above description is merely intended to provide an example of the transceiver 920, and components of the transceiver 920 are not limited to the RF transmitter and the RF receiver. In addition, the transceiver 920 may receive a signal and output the signal to the processor 910 through a radio channel, and transmit a signal output from the processor 910 through the radio channel.

In one embodiment of the disclosure, the memory 930 may store programs and data required for operation of the base station. In addition, the memory 930 may store control information or data included in a signal transmitted from or received by the base station. The memory 930 may include a storage medium, such as a ROM, a RAM, a hard disk, a CD-ROM, and a DVD, or a combination of such storage media. The memory 2503 may include a plurality of memories.

The methods according to the embodiments of the disclosure described in the claims or specification of the disclosure may be implemented by hardware, software, or a combination of hardware and software.

When the methods are implemented by software, a non-transitory, semi-transitory or transitory computer-readable storage medium storing one or more programs (software modules) may be provided. The one or more programs stored in the non-transitory computer-readable storage medium are configured to be executable by one or more processors included in an electronic device. The one or more programs include instructions that cause an electronic device to execute the methods according to the embodiments of the disclosure set forth in the claims or specification.

Such programs (software modules or software) may be stored in a random access memory, a non-volatile memory such as flash memory, a read-only memory (ROM), an electrically erasable programmable ROM (EEPROM), a magnetic disc storage device, a compact disc-ROM (CD-ROM), a digital versatile disc (DVD), other types of optical storage devices, or a magnetic cassette. Otherwise, such programs may be stored in a memory which is a combination of some or all the above storage media. Alternatively, a plurality of such memories may be provided.

The programs may be stored in an attachable storage device accessible via communication networks such as the Internet, an Intranet, a local area network (LAN), a wide LAN (WLAN) or a storage area network (SAN) or a combination thereof. Such a storage device may be connected to a device performing embodiments of the disclosure through an external port. In addition, a separate storage device in a communication network may be connected to a device that performs embodiments of the disclosure.

In the embodiments of the disclosure described above, each component included in the disclosure is expressed in a singular or plural form according to a presented embodiment of the disclosure. However, singular or plural expressions are appropriately selected according to a situation described for convenience of description and the disclosure is not limited by singular or plural components. Even components expressed in a plural form may be embodied in a singular form or even components expressed in a singular form may be embodied in a plural form.

Although embodiments of the disclosure have been described in the detailed description of the disclosure, various modifications may be made therein without departing from the scope of the disclosure. Therefore, the scope of the disclosure is not limited to the embodiments of the disclosure described herein and should be defined by the claims and their equivalents.

The invention claimed is:

1. A method performed by a mobile terminal in a wireless communication system, the method comprising:
executing a plurality of applications respectively corresponding to types of a plurality of secure elements installed in the mobile terminal, wherein the plurality of secure elements comprise one of a subscriber identity module (SIM) card, an integrated smart secure platform (iSSP), a universal integrated circuit card (UICC), or an embedded UICC (eUICC);
obtaining, from the plurality of secure elements, information for a plurality of communication service providers associated with the plurality of secure elements, based on the executing of the plurality of applications;
displaying information for first communication service providers available in a first SIM slot corresponding to a first wireless technology or a first wireless technology combination, and information for second communication service providers available in a second SIM slot corresponding to a second wireless technology or a second wireless technology combination, among the plurality of communication service providers, based on the obtained information; and in case that one of the first communication service providers is selected from user input, displaying information of at least one of one or more unselected first communication service providers as disabled and information of at least one of the second communication service providers as disabled, based on at least one policy information included in the obtained information, wherein information of the selected one of the first communication service providers is displayed as enabled.

2. The method of claim 1, wherein the information for the plurality of communication service providers is obtained from the plurality of secure elements by controlling entities for accessing communication service provider information, wherein the iSSP includes at least one of a SIM bundle or an embedded SIM (eSIM) bundle, wherein the plurality of applications includes at least one of a card application toolkit (CAT) client corresponding to the UICC, a local profile agent (LPA) corresponding to the eUICC or a secondary platform bundle (SPB) loader agent corresponding to the iSSP, and wherein the entities for accessing the communication service provider information include at least one of a CAT in the UICC, an issuer security domain root (ISD-R) in the eUICC or a SPB loader in the SIM bundle.

3. The method of claim 2, wherein the obtaining of the information comprises, when a type of a secure element is identified as the UICC, obtaining communication service provider information stored in the UICC by controlling the CAT through the CAT client.

4. The method of claim 2, wherein the obtaining of the information comprises, when a type of a secure element is identified as the eUICC, obtaining communication service provider information stored in the eUICC by controlling the ISD-R through the LPA.

5. The method of claim 2, wherein the obtaining of the information comprises:

when a type of a secure element is identified as the iSSP, obtaining a telecom bundle class identifier in the iSSP through the SPB loader agent;

identifying a type of a bundle included in the iSSP, based on the obtained telecom bundle class identifier; and when the iSSP includes the SIM bundle, obtaining communication service provider information stored in the SIM bundle by controlling the SPB loader through the SPB loader agent.

6. The method of claim 2, wherein the obtaining of the information comprises:

when a type of a secure element is identified as the iSSP, obtaining a telecom bundle identifier in the iSSP through the SPB loader agent;

identifying a type of a bundle included in the iSSP, based on the obtained telecom bundle identifier; and when the iSSP includes the eSIM bundle, obtaining communication service provider information provided in the eSIM bundle, wherein the communication service provider information stored in the eSIM bundle is obtained, based on one among information in a metadata extension of the eSIM bundle and information cached in the mobile terminal, or by controlling a Local Profile Agent (LPA) corresponding to the eSIM bundle.

7. The method of claim 6, wherein the obtaining of the communication service provider information stored in the eSIM bundle comprises:

identifying whether the eSIM bundle is disabled;

enabling the eSIM bundle, based on a result of the identifying; and obtaining the communication service provider information stored in the eSIM bundle, based on the LPA corresponding to the eSIM bundle.

8. The method of claim 1, wherein the at least one policy information includes:

first policy information of the plurality of secure elements or second policy information of a SIM bundle and an eSIM bundle, wherein the displaying of the information for first communication service providers and the information for second communication service providers comprises:

displaying a plurality of first selection boxes respectively corresponding to the first communication service providers and a plurality of second selection boxes respectively corresponding to the second communication service providers, wherein in case that a first selection box corresponding to the first communication service providers is selected, one or more selection boxes among the plurality of first selection boxes and the plurality of second selection boxes are displayed as disabled, based on the first policy information or the second policy information, and wherein the one or more selection boxes displayed as disabled includes:

a second selection box corresponding to the first communication service provider;

one or more first selection boxes other than the selected first selection box;

in case that the first communication service provider corresponds to an eUICC, one or more second selection boxes associated with the eUICC; and in case that the first communication service provider corresponds to the eSIM bundle, one or more second selection boxes associated with the eSIM bundle.

9. The method of claim 1, further comprising:

accessing at least one of a communication service provider server or a market server;

selecting a communication service provider to connect, based on the accessing; and determining a secure element for storing communication service provider information corresponding to the selected communication service provider.

10. The method of claim 9, further comprising:

transmitting information associated with the secure element to the communication service provider server or the market server;

receiving address information corresponding to the communication service provider information to be downloaded from the communication service provider server or the market server, based on the information associated with the secure element; and downloading the communication service provider information, based on the address information.

11. A mobile terminal in a wireless communication system, the mobile terminal comprising:

a transceiver; and a processor coupled to the transceiver and configured to:

execute a plurality of applications respectively corresponding to types of a plurality of secure elements installed in the mobile terminal, wherein the plurality of secure elements comprise one of a subscriber identity module (SIM) card, an integrated smart secure platform (iSSP), a Universal Integrated Circuit Card (UICC), or an embedded UICC (eUICC);

obtain, from the plurality of secure elements, information for a plurality of communication service providers associated with the plurality of secure elements, based on the executing of the plurality of applications;

display information for first communication service providers available in a first SIM slot corresponding to a first wireless technology or a first wireless technology combination, and information for second communication service providers available in a second SIM slot corresponding to a second wireless technology or a second wireless technology combination, among the plurality of the communication service providers, based on the obtained information; and in case that one of the first communication service providers is selected from user input, display information of at least one of unselected one or more first communication service providers as disabled and information of at least one of the second communication service providers as disabled, based on at least one policy information included in the obtained information, wherein information of the selected one of the first communication service providers is displayed as enabled.

12. The mobile terminal of claim 11, wherein the information for the plurality of communication service providers is obtained from the plurality of secure elements by controlling entities for accessing communication service provider information, wherein the iSSP includes at least one of a SIM bundle or an embedded SIM (eSIM) bundle, wherein the plurality of applications includes at least one of a card application toolkit (CAT) client corresponding to the UICC, a local profile agent (LPA) corresponding to the eUICC or a secondary platform bundle (SPB) loader agent corresponding to the iSSP, and wherein the entities for accessing the communication service provider information include at least one of a CAT in the UICC, an issuer security domain root (ISD-R) in the eUICC or a SPB loader in the SIM bundle.

13. The mobile terminal of claim 12, wherein, when a type of a secure element is identified as the UICC, the processor is further configured to obtain communication service provider information stored in the UICC by controlling the CAT through the CAT.

14. The mobile terminal of claim 12, wherein, when a type of a secure element is identified as the eUICC, the processor is further configured to obtain communication service provider information stored in the eUICC by controlling the ISD-R through the LPA.

15. The mobile terminal of claim 12, wherein, when a type of a secure element is identified as the iSSP, the processor is further configured to:

obtain a telecom bundle class identifier through the SPB loader agent;

identify a type of a bundle included in the iSSP, based on the obtained telecom bundle class identifier; and when the iSSP includes the SIM bundle, obtain communication service provider information stored in the SIM bundle by controlling the SPB loader through the SPB loader agent.

16. The method of claim 1, wherein based on the at least one policy information, the at least one of the one or more unselected first communication service providers and the at least one of the second communication service providers are not allowed to be simultaneously enabled with the selected first communication service provider.

* * * * *